G. A. HOLMES.
STUD FOR SNAP FASTENERS.
APPLICATION FILED APR. 6, 1918.

1,273,491.

Patented July 23, 1918.

Inventor
George A. Holmes
By William B. H. Downs
Attorney

UNITED STATES PATENT OFFICE.

GEORGE A. HOLMES, OF NEWTON CENTER, MASSACHUSETTS, ASSIGNOR TO FRED JOY, OF WINCHESTER, MASSACHUSETTS.

STUD FOR SNAP-FASTENERS.

1,273,491.   Specification of Letters Patent.   Patented July 23, 1918.

Application filed April 6, 1918. Serial No. 227,128.

*To all whom it may concern:*

Be it known that I, GEORGE A. HOLMES, a citizen of the United States, and residing at 140 Sumner St., Newton Center, Massachusetts, have invented certain new and useful Improvements in Studs for Snap-Fasteners, of which the following is a specification.

This invention relates to the stud member for a snap fastener of the kind commonly used in automobile body work for securing the curtains to the body.

The object of the present invention is to produce a stud member of the desired character at less cost than that of the stud members heretofore used for this purpose.

Figure 1:
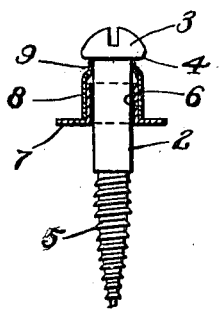
Figure 2:

Figure 1 is a side elevation partly in section of a stud member made in accordance with this invention; Fig. 2 is a sectional view of one of the components thereof detached; and Figs. 3 and 4 sectional views of another component thereof.

As shown in Fig. 1 the stud comprises a main body or core 2, which is substantially an ordinary round headed wood screw, except that the outer circumference of the head portion 3 is rounded as shown at 4 and is accurately finished to the size required.

In order to insure the positioning of the head 3 at the proper distance from the surface of the body when the threaded portion 5 of the shank is screwed into the same, and to provide a suitable support for the socket member when fastened over the stud, the main body piece or core 2 is provided with a stop piece such as shown in Fig. 2, having a tubular portion 6 which fits snugly upon the shank of the main core piece, and an outwardly turned flange 7 forming a base which comes to a bearing upon the surface of the body when the stud member is secured thereto.

Figure 3:
Figure 4:
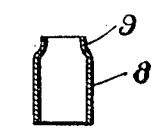

In order to fix the stop piece on the core with its base flange 7 at the proper distance from the head 3, and to provide a suitable bearing for the socket member when engaged with the stud member, a tubular socket supporting piece such as shown in Fig. 3 is provided, the main body 8 of which is of the right internal diameter to fit snugly upon the tubular portion 6 of the stop piece. The said supporting piece is contracted at one end as shown at 9 to an internal diameter which fits snugly upon the shank of the core just below the head 3 and thus provides an annular groove around the stud member at the base of the head for coöperating with a latching device such as is usually provided in the socket member.

The stop piece and latch support, shown separately in Figs. 2 and 3, are of such character that they may be made by drawing from sheet metal, commonly brass, and may thus be produced at moderate cost and with uniformity of size, and they are of such size that when assembled upon the core as shown in Fig. 1 they fit snugly and require considerable pressure to force them to the assembled position with the tapering end 9 against the shoulder or lower face of the head 3 and with the other end of the tube 8 against the flange or foot 7, thus firmly uniting the components so that they cannot become separated in the handling to which they may be subjected before being applied to the vehicle body on which they are to be used.

In some cases it is desirable that the portion of the stud member which projects from the body should be longer than in others, as where the stud is required to hold two curtains, in which case the socket member of the inner curtain is crowded down on to the cylindrical portion 8, while the outer socket member rests with its latch in the groove under the head 3. In order to provide for such different sizes or lengths of studs it is necessary only to make the tubular latch supporting component 8, 9, of the proper length; one of a length sufficient to hold two or more socket members, one over the other, being shown in Fig. 4.

What I therefore claim and desire to secure by Letters Patent is:

A stud member for snap fasteners comprising a main integral core having a convex head and a screw threaded shank; and a stop piece having a tubular portion, which fits snugly on the shank of the core, and a base flange at right angles thereto; and a socket supporting piece composed of a tube reduced or contracted at one end, said tube fitting snugly upon the tubular portion of the stop piece, and the contracted end fitting the shank portion of the core, and said tube being engaged at one end by the head of the core, and at the other end by the flange of the stop piece substantially as and for the purpose described.

In testimony whereof, I have signed my name to this specification.

GEORGE A. HOLMES.